United States Patent
Garrison et al.

[15] 3,695,378
[45] Oct. 3, 1972

[54] CYLINDER FOR POWER STEERING SYSTEM WITH RELEASABLE HYDRAULIC STOPS

[72] Inventors: Robert A. Garrison, Newport Beach; Leonard L. Conopa, Westminster, both of Calif.

[73] Assignee: Garrison Manufacturing Co., Inc., Santa Ana, Calif.

[22] Filed: Nov. 27, 1970

[21] Appl. No.: 93,044

[52] U.S. Cl. ............... 180/79.2 R, 60/52 S, 91/405, 92/85
[51] Int. Cl. ............................................. B62d 5/06
[58] Field of Search ........ 180/79.2 R; 60/52 S; 91/26, 91/396, 404, 405, 406, 407; 92/85

[56] References Cited

UNITED STATES PATENTS

| | | | |
|---|---|---|---|
| 3,602,326 | 8/1971 | Garrison | 180/79.2 R |
| 3,175,725 | 3/1965 | Sampson | 91/26 X |
| 2,824,447 | 2/1958 | Garrison | 180/79.2 R |
| 3,291,245 | 12/1966 | Hewko | 180/79.2 R |
| R23,867 | 9/1954 | Garrison | 180/79.2 R |
| 2,911,952 | 11/1959 | Peras | 91/405 X |
| 3,196,753 | 7/1965 | Maurer | 91/26 |
| 3,247,767 | 4/1966 | Aslan | 91/396 X |
| 3,260,167 | 7/1966 | Pedersen et al. | 91/396 X |

FOREIGN PATENTS OR APPLICATIONS

| | | | |
|---|---|---|---|
| 527,013 | 10/1940 | Great Britain | 180/79.2 R |

*Primary Examiner*—Kenneth H. Betts
*Assistant Examiner*—Leslie J. Paperner
*Attorney*—Harris, Kiech, Russell & Kern

[57] ABSTRACT

A fluid operated power steering system having a control motor for actuating a steering valve which, in turn, actuates a fluid operated steering motor, the system including manually operable control means for delivering fluid under pressure from a pump to opposite ends of the control motor selectively. The control motor includes a control cylinder having axial cylindrical recesses at its ends, and includes a control piston having on opposite sides thereof complementary axial cylindrical plungers respectively insertable into the recesses so that fluid trapped in the recesses provides hydraulic stops for the control piston at the ends of its stroke. A relief valve discharges fluid from the recesses into a reservoir in the event excessive pressures are developed in the recesses due to external forces, such as the encountering of obstructions by the steerable wheels of the vehicle on which the system is installed. Under such conditions, the control system overrides the hydraulic stops and encounters mechanical stops at the ends of the control cylinder. With this construction, the hydraulic stops normally limit the travel of the control piston, but can be overcome if necessary to permit overtravel of the steerable wheels. Under such conditions, the hydraulic stops have a cushioning effect on the control piston and limit the severity of contact with the mechanical stops.

1 Claim, 3 Drawing Figures

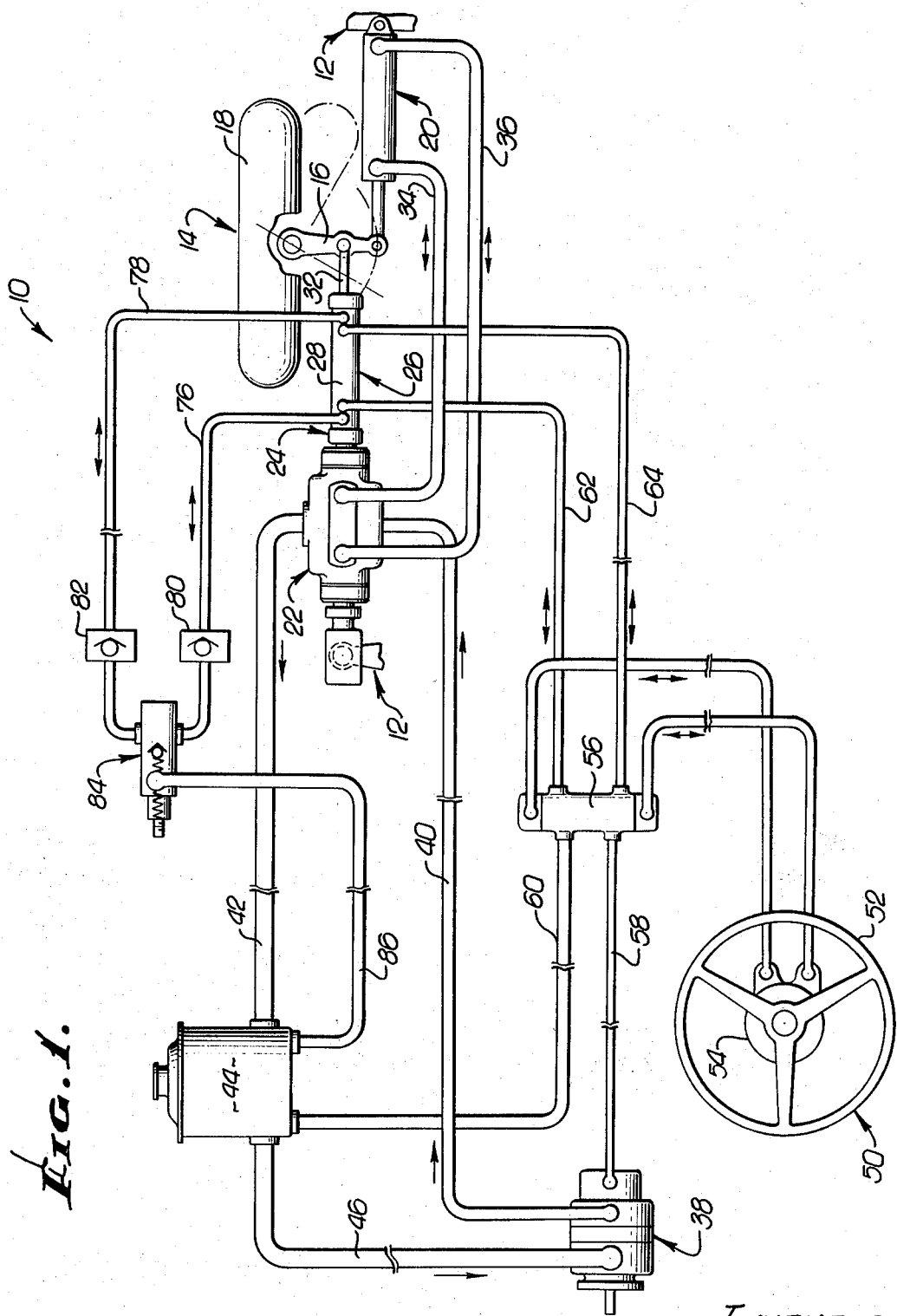

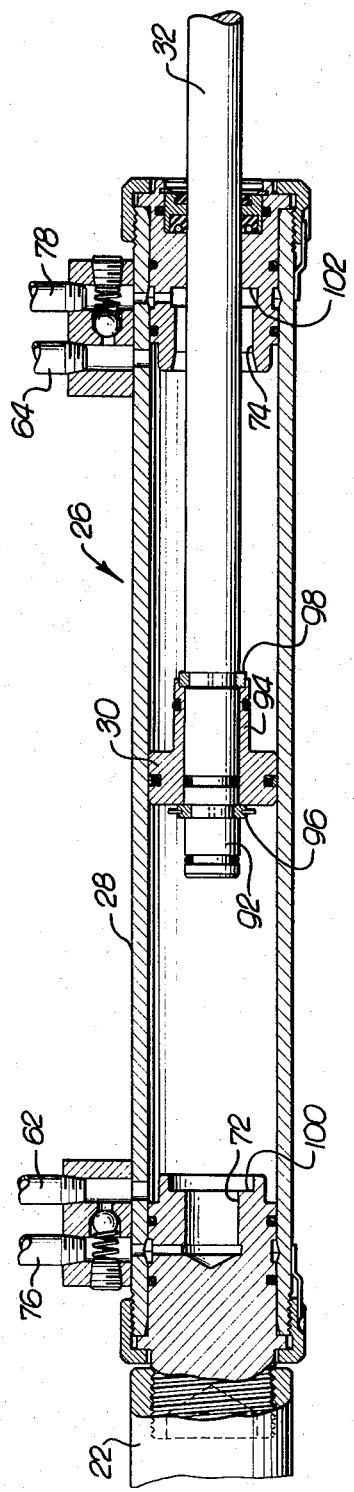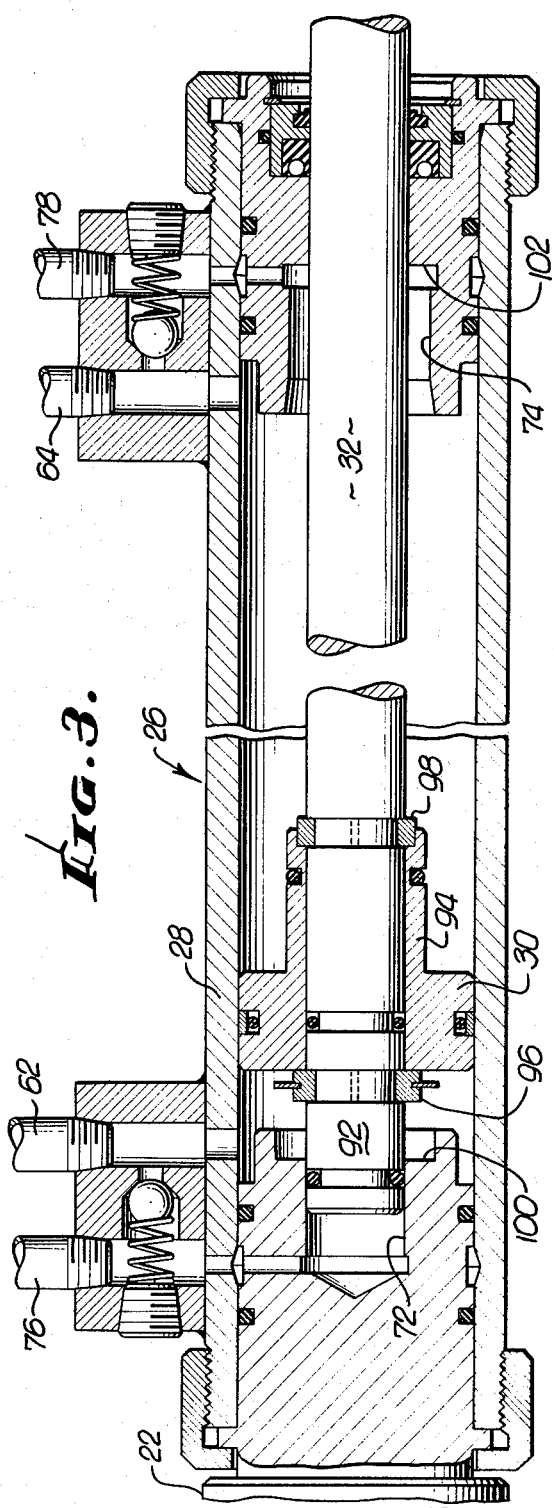

CYLINDER FOR POWER STEERING SYSTEM WITH RELEASABLE HYDRAULIC STOPS

BACKGROUND OF INVENTION

The present invention relates in general to a power steering system and, more particularly, to a fluid operated system generally similar to those disclosed in Garrison U.S. Pat. No. Re. 23,867, reissued Sept. 14, 1954, and in Garrison U.S. Pat. No. 2,824,447, issued Feb. 25, 1958. Each of these patents discloses a vehicle having some steerable means, such as steering arms or a steering linkage connected to steerable wheels, which is acted on by a fluid operated steering motor of the reciprocating type controlled by a steering valve having a reciprocable valve element of the spool type therein. In each instance, a manual steering input displaces the valve element of the steering valve in one direction or the other to cause the steering motor to displace the steerable means correspondingly. The steering valve disclosed in each of these patents includes a ball stud which engages the valve element and determines its position relative to the ports in the housing of the steering valve in response to a manual steering input force.

The fluid operated power steering system of each of the aforementioned patents also includes a steering pump which supplies fluid under pressure to the steering valve, the latter, in turn, delivering the fluid under pressure to one end or the other of the steering motor, or, in the absence of a steering input force, simply returning it to a reservoir connected to the steering pump inlet.

The present invention involves a steering motor, steering valve and steering pump and reservoir assembly identical in principle to those disclosed in Garrison's aforementioned patents. The latter are, therefore, incorporated herein by reference.

The present invention further involves a control motor which is connected to the steering valve to form a steering valve link, and which actuates the steering valve in response to selective application of fluid pressure to opposite ends of the control motor. A manually operable control means delivers fluid under pressure from the steering pump to opposite ends of the control motor selectively.

SUMMARY AND OBJECTS OF INVENTION

With the foregoing as background, a primary object of the invention is to provide a fluid operated power steering system of the nature outlined wherein the control motor is provided with hydraulic stops limiting the travel of the control piston thereof, and wherein the steering system is provided with means for overriding the hydraulic stops in the event that external forces applied to the steerable wheels, or other steerable means, require overtravel of the steerable means. For example, such external forces may result from obstructions encountered by the steerable wheels.

With the foregoing construction, the hydraulic stops normally limit the travel of the control piston, but can be overridden if necessary to permit overtravel of the steerable means.

A further object is to provide the control motor with mechanical stops for the control piston which are operative when the hydraulic stops are overridden. Under such conditions, the hydraulic stops have a cushioning effect which limits the engagement forces between the control piston and the mechanical stops, which is another feature of the invention.

More particularly, an important object of the invention is to provide the control cylinder with axial cylindrical recesses at its ends and to provide the control piston on opposite sides thereof with complementary axial cylindrical plungers respectively insertable into the recesses so that the fluid trapped in the recesses stops the control piston at the ends of its stroke.

Still another important object is to provide relief valve means connected to the recesses for discharging trapped fluid therefrom into the reservoir to permit overtravel of the control piston whenever this is necessary to permit overtravel of the steerable means, in response to encountering an obstruction, for example.

The foregoing objects, advantages, features and results of the present invention, together with various other objects, advantages, features and results thereof which will be evident to those skilled in the fluid operated power steering art in the light of this disclosure, may be achieved with the exemplary embodiment of the invention described in detail hereinafter and illustrated in the accompanying drawings.

DESCRIPTION OF DRAWINGS

In the drawings:

FIG. 1 is a diagrammatic view of a fluid operated power steering system embodying the invention;

FIG. 2 is a longitudinal sectional view of a control motor incorporated in the power steering system of FIG. 1 and embodying the invention, the control piston of the control motor being shown in an intermediate position; and FIG. 3 is an enlarged view similar to FIG. 2, but showing the control piston at one end of its stroke.

DESCRIPTION OF EXEMPLARY EMBODIMENT OF INVENTION

Referring initially to FIG. 1 of the drawings, designated generally therein by the numeral 10 is a fluid operated power steering system for a vehicle having a frame shown fragmentarily at 12 and having steerable means 14. The latter is shown for purposes of illustration as including a steering arm 16 connected to a steerable wheel 18. Of course, the vehicle may include two steerable wheels having steering arms interconnected by a tie rod, not shown.

The power steering system 10 includes a fluid operated steering motor 20 of the reciprocating type connected at one end to the frame 12 and at its other end to the steering arm 16. The steering motor 20 is connected to and controlled by a steering valve 22 of the type disclosed in the aforementioned patents. The steering valve 22 constitutes one end of a steering valve link 24 which is connected at one end to the frame 12 and at its other end to the steering arm 16, the other end of the steering valve link 24 comprising a fluid operated control motor 26 of the reciprocating type. As shown in FIGS. 2 and 3, the control motor 26 includes a control cylinder 28, one end of which is connected to the housing of the steering valve 22. Reciprocable in the control cylinder 28 is a control piston 30 connected to a piston rod 32 which projects from the other end of the control cylinder and is connected to the steering arm 16.

Reverting to FIG. 1 of the drawings, the steering valve 22 controls the steering motor 20 through interconnecting fluid lines 34 and 36. The steering valve 22 is supplied with operating fluid under pressure by a steering pump 38 through a fluid supply line 40. A fluid return line 42 connects the steering valve 22 to a reservoir 44, the latter being connected to the inlet of the steering pump 38 through a fluid inlet line 46.

The fluid operated power steering system 10 of the invention includes manually operable control means 50 for delivering fluid under pressure from the steering pump 38 to the control cylinder 28 on opposite sides of the control system 30 selectively, depending on the direction in which it is desired to steer the vehicle. The control motor 26 actuates the steering valve 22 correspondingly, and the steering valve, as disclosed in the aforementioned prior patents, correspondingly actuates the steering motor 20 to steer the vehicle in the desired direction.

The control means 50 is shown as including a manually operable steering wheel 52 which drives a control pump 54 for selectively applying fluid pressure to opposite ends of a fluid operated control valve 56, depending on the direction in which the steering wheel is turned. The control valve 56 has connected thereto supply and return lines 58 and 60 respectively leading from the steering pump 38 and to the reservoir 44. Control lines 62 and 64 extend from the control valve 56 to opposite ends of the control cylinder 28, and deliver fluid under pressure from the pump 38 to one side of the control piston 30 or the other, depending on which way the valve element within the control valve 56 is displaced by clockwise or counterclockwise rotation of the steering wheel 52.

Considering the operation of the power steering system 10 as thus far described, rotation of the steering wheel 52 in one direction or the other results in delivery of fluid under pressure to one end of the control cylinder 28 or the other, thereby either lengthening or shortening the steering valve link 24. Any such variation in the length of this link results in corresponding actuation of the steering valve 22 to cause it to actuate the steering motor 20 in the corresponding direction.

It will be understood that, with the foregoing construction, the steerable means 14 will remain in whatever position it is placed, until such time as the steering wheel 52 is again turned to change the position of the steerable means. It will also be understood from the aforementioned patents that the steering valve 22 is an open center valve when the steering wheel 52 is stationary. The same is true of the control valve 56.

Turning now to FIGS. 2 and 3 for a more detailed consideration of the control motor 26, the control cylinder 28 is provided at its ends with axial cylindrical cavities or recesses 72 and 74 having fluid lines 76 and 78 in communication therewith. These fluid lines have check valves 80 and 82 therein and communicate with a pressure relief valve or relief valve means 84 which, in turn, communicates with the reservoir 44 through a line 86.

The control piston 30 is provided on opposite sides thereof with axial cylindrical plungers 92 and 94 respectively complementary to and insertable into the axial recesses 72 and 74 at the ends of the control cylinder 28. The plungers 92 and 94 are equipped with O-rings, or the like, to provide fluid-tight seals with the walls of the recesses 72 and 74.

Considering the operation of the control motor 26 in conjunction with the pressure relief valve 84, it will be apparent that, when the control piston 30 reaches either end of its stroke, the corresponding plunger 92 or 94 enters the corresponding recess 72 or 74 until the fluid trapped in such recess prevents further movement of the control piston. Thus, the fluid trapped in the recess 72 or 74 by the corresponding plunger 92 or 94 acts as a hydraulic stop limiting movement of the control piston 30. Under normal operating conditions, there is no necessity for any mechanical stop.

However, external forces can occur requiring a greater travel of the control piston 30 than that permitted by the hydraulic stops formed by the plungers 92 and 94 in the recesses 72 and 74. For example, the steerable wheel 18 may encounter an obstruction which applies an external force tending to cause overtravel of the control piston 30 in one direction or the other. When sufficient pressure is developed in one of the recesses 72 or 74 as the result of such an external force, the pressure relief valve 84 opens to permit corresponding overtravel of the control piston 30 by permitting the discharge of trapped fluid into the reservoir 44. Ultimately, mechanical stops 96 and 98 on the control piston 30 respectively engage mechanical stops 100 and 102 at the ends of the control cylinder 28 to limit the extent of control piston overtravel in the two directions.

Thus, the invention provides normally operative hydraulic stops which can be overridden to permit control piston overtravel when necessary in response to external forces. The mechanical stops limit such overtravel. It is important to know that the hydraulic stops have a cushioning effect on the mechanical stops, limiting the engagement forces involved at the extreme ends of the control piston stroke.

Although an exemplary embodiment of the invention has been disclosed for purposes of illustration, it will be understood that various changes, modifications and substitutions may be incorporated in such embodiment without departing from the spirit of the invention as set forth in the claims constituting the next section of this specification.

We claim as our invention:

1. In a fluid operated power steering system for a vehicle having a frame and steerable means subject to external forces, the combination of:
   a. a fluid operated steering motor connected to the steerable means and to the frame;
   b. a steering valve link connected to the steerable means and to the frame;
   c. said steering valve link including a steering valve connected to and controlling said steering motor, and including a control motor comprising a control cylinder and a control piston;
   d. a pump;
   e. manually operable control means for delivering fluid under pressure from said pump to said control cylinder on opposite sides of said control piston selectively;
   f. said control cylinder having axial cylindrical recesses at its ends, and said control piston having on opposite sides thereof complementary axial cylindrical plungers respectively insertable into said recesses so that fluid trapped in said recesses hydraulically stops said control piston at the ends of its stroke;
g. a reservoir connected to said pump;
h. means connecting said recesses to said reservoir; and
i. relief valve means in said connecting means for discharging fluid from said recesses into said reservoir to permit overtravel of said control piston in response to excessive external forces on the steerable means.

* * * * *